United States Patent [19]

Muramatsu et al.

[11] Patent Number: 5,266,984
[45] Date of Patent: Nov. 30, 1993

[54] EXPOSURE CALCULATING APPARATUS FOR CAMERA

[75] Inventors: Masaru Muramatsu, Kawasaki; Hiroyuki Iwasaki, Tokyo; Hiroyuki Abe, Kawasaki, all of Japan

[73] Assignee: Nikon Corporation, Tokyo, Japan

[21] Appl. No.: 852,975

[22] Filed: Mar. 17, 1992

[30] Foreign Application Priority Data

Mar. 22, 1991 [JP] Japan .................................. 3-83665
May 24, 1991 [JP] Japan .................................. 3-149482

[51] Int. Cl.$^5$ ............................................. G03B 7/08
[52] U.S. Cl. ..................................... 354/432; 354/412
[58] Field of Search ............................. 354/432, 412

[56] References Cited

U.S. PATENT DOCUMENTS

| | | | |
|---|---|---|---|
| 4,339,185 | 7/1982 | Nakauchi et al. | 354/31 |
| 4,618,236 | 10/1986 | Akashi et al. | 354/406 |
| 4,951,082 | 8/1990 | Takagi | 354/432 |
| 4,978,990 | 12/1990 | Yamasaki et al. | 354/432 |
| 5,048,100 | 9/1991 | Kuperstein | 382/36 |
| 5,111,232 | 5/1992 | Tsunetuji | 354/412 |
| 5,111,301 | 5/1992 | Haruki et al. | 358/228 |

FOREIGN PATENT DOCUMENTS

| | | |
|---|---|---|
| 0379808 | 8/1990 | European Pat. Off. . |
| 0468533 | 1/1992 | European Pat. Off. . |
| 2-96723 | 4/1990 | Japan . |
| 3-17636 | 1/1991 | Japan . |

OTHER PUBLICATIONS

Patent Abstracts of Japan, vol. 14, No. 303 (P-1070) Jun. 29, 1990.
Patent Abstracts of Japan, vol. 14, No. 569 (P-1144) Dec. 18, 1990.
Patent Abstracts of Japan, vol. 14, No. 585 (P-1148) Dec. 27, 1990.
Patent Abstracts of Japan, vol. 15, No. 189 (C-0831) May 15, 1991.

*Primary Examiner*—Russell E. Adams
*Attorney, Agent, or Firm*—Shapiro and Shapiro

[57] ABSTRACT

An exposure calculating apparatus for a camera has a plurality of processing devices for variously processing photometric outputs from regions of an object field divided into plural sections according to photographic conditions so as to determine the optimum exposure value according to the results of processes performed by the processing devices, the exposure calculating apparatus for a camera including: a device for setting a plurality of fuzzy rules in the form of membership functions corresponding to the processes performed by the plurality of processing devices; a device for calculating the grade of each of the fuzzy rules according to a plurality of values of photometry generated from photometric outputs from the plurality of regions; a device which selects fuzzy rules having the grades obtained by the calculations so as to calculate, according to the plurality of photometric outputs, exposure values obtained by the processes performed by the processing device which correspond to the selected fuzzy rules; and a device for determining the optimum exposure value by weighting, with the grade, each of the exposure values obtained by the processes performed by the processing devices.

6 Claims, 9 Drawing Sheets

EXPOSURE CALCULATING APPARATUS FOR CAMERA

BACKGROUND OF THE INVENTION

1. Field of the Invention

The present invention relates to a multiphotometric apparatus, and, more particularly to a multiphotometric apparatus which divides an object field into a plurality of regions to measure the luminance of each region so as to determine the optimum exposure value by using a fuzzy inference performed according to the output which denotes the measured luminance of each region.

2. Related Background Art

A conventional multiphotometric apparatus detects, as input values, luminance value BVO at the central portion of the frame, maximum luminance value BVmax, minimum luminance value BVmin, maximum luminance difference dBV, mean luminance BVmean from a plurality of outputs denoting the results of the measurements of the luminance obtained by dividing the object field into a plurality of regions and by measuring the luminance of each region. The input values thus detected are given boundary values and are combined to one another so as to select an exposure value and to make it to be the optimum exposure value, the exposure value being a value calculated by any one of calculating equations corresponding to, for example, four photometric methods, that is the mean photometry BVmean, the central value photometry BVO, high luminance weighted photometry (BVmean+BVmax)/2 and low luminance weighted photometry (BVmean+BVmin)/2.

Figure 10:
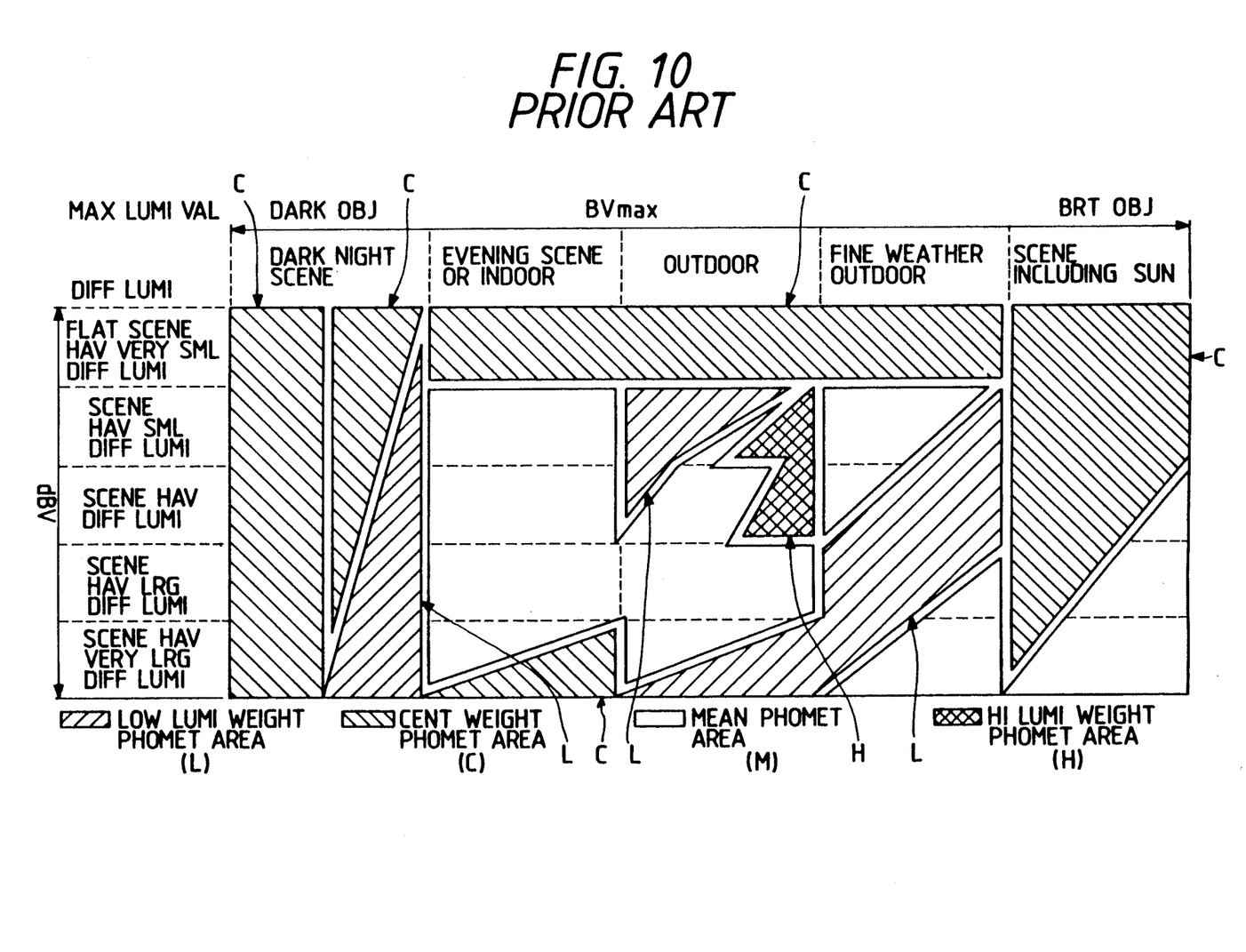
FIG. 10 illustrates example of a photometric area for setting the boundary value for selecting the calculation equation which corresponds to the photometric method.

In this case, the boundary values for selecting the aforesaid calculation equations are determined by, for example as shown in FIG. 10, providing photometric areas by calculating equations according to the values of the luminance difference dBV and the maximum luminance value BVmax. Referring to FIG. 10, the luminance difference dBV and the maximum luminance value BVmax are respectively divided into 5 stages and low luminance weighted photometric area L, central portion weighted photometric area C, mean photometric area M and high luminance weighted photometric area H are determined as illustrated according to each stage. For example, in a case where the luminance difference dBV is a middle value and the maximum luminance value is a relatively dark object of a degree such as an evening scene or an indoor object, the mean photometry is selected.

However, the conventional multiphotometric apparatus has no means for overcoming a problem that takes place relating to input values adjacent to the boundary regions between photometric areas. That is, there sometimes arises a case in which calculation equations BVmeans of the mean photometric area M and (BVmeans+ BVmax) of the high luminance weighted photometric area H having different output values are positioned adjacently. In this case, when an object positioned in the vicinity of the boundary value is photographed, there arises a problem in that the former or the latter calculation equation is selected occasionally.

In order to overcome a problem of the type described above, a camera has been disclosed in, for example, Japanese Patent Laid-Open No. 3-17636 and is arranged to determine an exposure value by adding weight coefficients to a plurality of photoelectrically converted outputs according to a fuzzy inference.

However, the aforesaid conventional camera encounters a problem in that the photometric method for determining the exposure value is limited because its photometric means, which generates a plurality of photoelectrically converted outputs corresponding to the luminance distribution of the object, determines the exposure value by directly adding the weighting coefficients corresponding to the results of the fuzzy inference to the aforesaid photoelectrically converted outputs. Another problem arises in that the exposure cannot be determined by a plurality of photometric methods. If it can be determined, an excessively complicated process must be performed.

On the other hand, neural networks are known which exhibit excellent pattern recognizing performance and a photometric apparatus for a camera has been suggested (Japanese Patent Laid-Open No. 2-96723) which receives a photometric output divided by the neural network and in which the weight of coupling of the network is previously determined by learning and the output of the network is made to be the exposure value in a state where the weight of coupling is fixed when a microcomputer mounted on the camera. By properly structuring the network, a substantially proper exposure value of the subject having the learned pattern can be obtained.

However, the aforesaid conventional photometry calculating method encounters a problem in that the exposure value becomes unstable due to a slight change in the frame if the object is positioned at a boundary of the estimated photography scene.

In order to be adapted to a multiplicity of photographic scenes, there arises a necessity of classifying into a further large number of patterns, causing the selection of the optimum exposure value to become complicated. Therefore, a photographic scene, which has not been estimated, cannot be predicted and therefore a value, which is excessively different from the proper exposure value, is undesirably obtained.

The network for weighting the photographic scene must be properly structured in order to obtain a substantially proper exposure value for the estimated photographic scene. In order to obtain this, the size of the network cannot be reduced and the microcomputer mounted on the camera cannot satisfactorily process the required quantity of calculations and an excessively large number of data items are required to classify the pattern.

SUMMARY OF THE INVENTION

An object of the present invention is to enable a proper exposure value to be determined by a relatively simple process and by utilizing the advantages obtainable from a plurality of photometric methods in such a manner that a proper exposure value can be obtained even if the object is positioned in the vicinity of a boundary value.

Another object of the present invention is to provide a photometric apparatus for a camera capable of giving smooth exposure values to correspond to change in the photographic scene, predicting the result of exposure and giving an optimum exposure value to various objects while necessitating only a satisfactory small quantity of learning.

Other and further objects, features and advantages of the invention will appear more fully from the following description.

DESCRIPTION OF THE PREFERRED EMBODIMENTS

Figure 1:
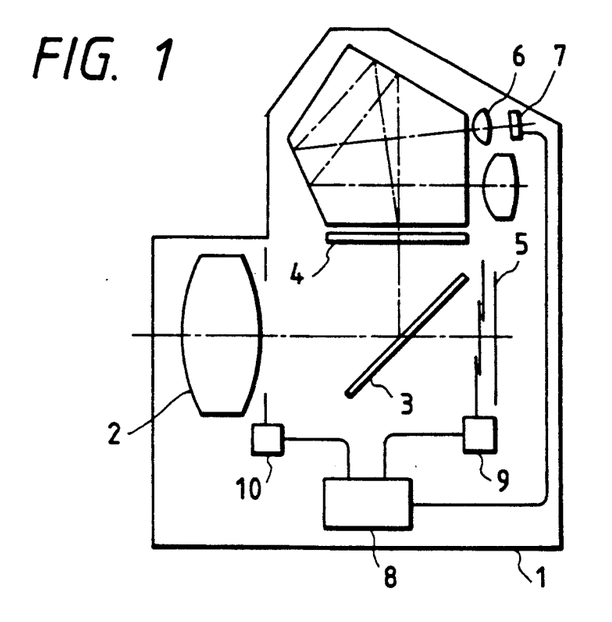
FIG. 1 illustrates the schematic structure of a single-lens reflex camera including a multiphotometric apparatus according to a first embodiment of the present invention.

Preferred embodiments of the present invention will now be described with reference to the drawings. FIG. 1 illustrates the structure of a single-lens reflex camera 1 in which a multiphotometric apparatus according to a first embodiment of the present invention is embodied. The camera 1 shown in FIG. 1 comprises a photographic lens 2, a quick return mirror 3, a focusing screen 4, a film 5, a photometric re-imaging lens 6, a photometric light receiving device 7 having a plurality of light receiving devices, a calculating device 8 comprising a microcomputer, a shutter drive device 9 and a diaphragm drive device 10.

Figure 2:
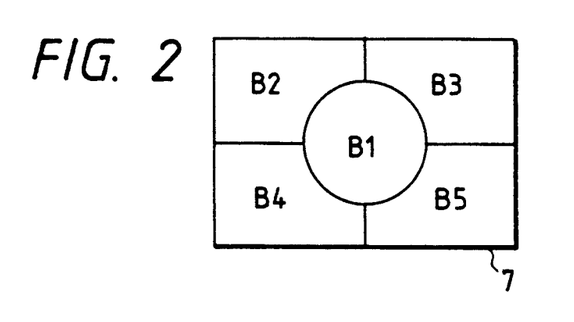
FIG. 2 illustrates photometric regions of a photometric light receiving device of the camera shown in FIG. 1.

The photometric light receiving device 7 is able to obtain photometric outputs B1, B2, B3, B4 and B5 from respective regions formed by dividing the photographic frame into five regions as shown in FIG. 2.

In the camera shown in FIGS. 1 and 2, light transmitted from an object (omitted from illustration) passes through the photographic lens 2 and is reflected by the quick return mirror 3. Then, it is imaged on the focusing screen 4 so as to be observed. Simultaneously, an image of the object formed on the focusing screen 4 is, by the photometric re-imaging lens 6, imaged on the photometric light receiving device 7 structured as shown in FIG. 2. The light receiving device 7 supplies photoelectrically converted outputs B1, B2, ..., B5, which correspond to 5 regions obtained by dividing the photographic frame, to the calculating device 8. The calculating device 8 determines the optimum value by a method to be described later. At the time of photographing an object, the shutter drive device 9 and the diaphragm drive device 10 are controlled, so that the film 5 is exposed to light.

An operation for determining the optimum exposure value to be performed by the calculating device 8 will now be described. The multiphotometric apparatus according to the present invention makes the exposure value to be a suitable value by applying the fuzzy theory so that exposure values of an object in the vicinity of the boundary obtained by a plurality of photometric methods performed simultaneously are synthesized to make the exposure value to be a suitable value.

Figure 3A:
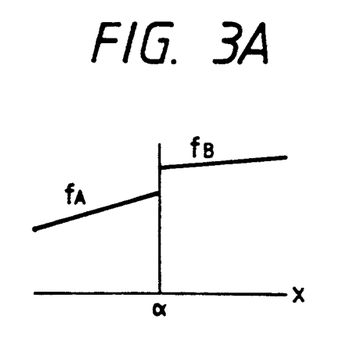
FIGS. 3A and 3B are graphs which illustrate the elimination of the step present in the vicinity of the boundary value by means of the fuzzy inference.

Assumptions are made that there are two spaces A and B bisectioned by boundary value $X = \alpha$ as shown in FIG. 3A and the linear form of each space is $f_A$ and $f_B$ When $\alpha + dx$ very close to $\alpha$ is supplied, $f_B$ is selected because the input exceeds $\alpha$ by a slight degree. However, the characteristics of $f_A$ must be taken into consideration in a case of input data close to the boundary value $\alpha$.

Figure 4A:
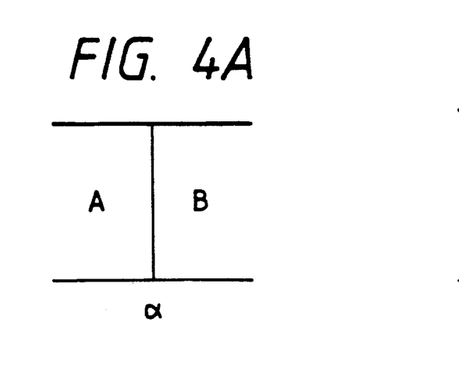
FIGS. 4A and 4B illustrate a method of connecting adjacent spaces by means of the fuzzy inference.
Figure 4B:
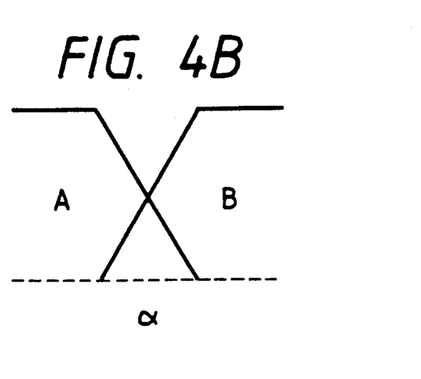

Therefore, as an alternative to completely dividing the spaces A and B while making the boundary value $\alpha$ to be the boundary as shown in FIG. 4A, the boundaries are crossed as shown in FIG. 4B, so that a relationship in which the input value relates to both the spaces A and B can be realized.

Figure 3B:
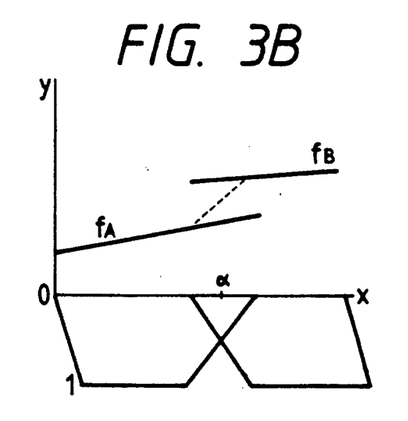
Figure 5:
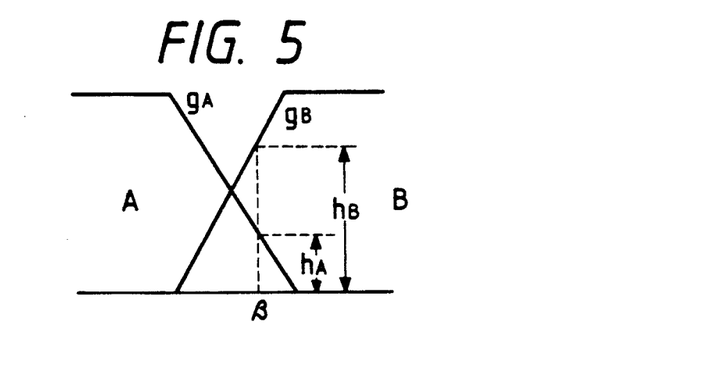
FIG. 5 illustrates the grades of input value for each space.
Figure 6:
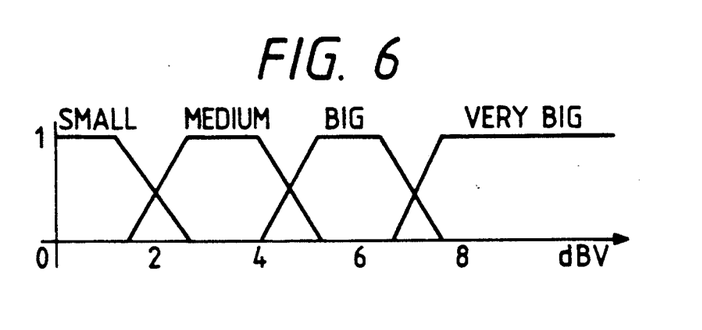
FIG. 6 is a graph which illustrates an example of a membership function.

That is, in a case where input value 8 crosses both boundary line $g_A$ of the space A and boundary line $g_B$ of the space B as shown in FIG. 5, the input value $\beta$ relates to both of the spaces A and B. Assuming in this case that the heights of intersections of the boundary line $g_A$ of the space A, the boundary line $g_B$ of the space B and $X = B$ are $h_A$ and $h_B$, the aforesaid values $h_A$ and $h_B$ are considered to be the degree at which the input B belongs to the regions A and B, that is grades. The function which shows the shape of each of the boundary lines $g_A$ and $g_B$ is called a "membership function". The fuzzy inference is a method in which the grade of the input value is obtained by using the aforesaid membership function so as to eliminate a rapid shift (change) of the output value adjacent to the boundary value. That is, the boundary region is, as designated by a dashed line shown in FIG. 3B, made inwardly, so that a plurality of linear forms can be smoothly connected to one another. FIG. 6 illustrates an example of a membership function about maximum luminance difference dBV which is one of the photometric values for use in the multiphotometric apparatus according to the present invention.

Now, a description will be given about a process of determining the optimum exposure value obtainable by the multiphotometric apparatus according to an embodiment of the present invention and included in the camera shown in FIG. 1. According to the present invention, luminance value BV0 at the central portion of the frame which is equal to photometric output b1 of 5 photometric outputs obtained from the photometric light receiving device 7 shown in FIG. 2, maximum luminance value BVmax of the photometric youtputs B1, B2, ..., B5, minimum luminance value BVmin of the same, maximum luminance difference dBV which is the difference between the maximum output of the photometric outputs B1, 2, ..., B5 and the minimum output of the same and the mean luminance BVmeans which is the mean value of the photometric outputs B1, B2, ... , B5 are calculated so as to use them as input values.

According to the input values thus detected, exposure values are calculated by a plurality of photometric methods. The exposure values calculated by the photometric methods are weighted according to the grades obtained by the fuzzy inference, so that the optimum exposure value is determined.

In this case, fuzzy rules are set to correspond to the photometric methods by means of the membership function. According to the present invention, the following input values are used: the maximum value (BVmax) of a plurality of photometric outputs, the difference (dBV) between the maximum value and the minimum value, a value (SKY) which indicates the upper portion of the object field and a value (CENTER) which indicates the central portion of the object field. The value (SKY) which indicates the upper portion of the object field is a mean value of outputs B2 and B3 of the light receiving device 7 shown in FIG. 2, while the value (CENTER) which indicates the central portion of the object field is the same as output B1 of the same.

Figure 7:
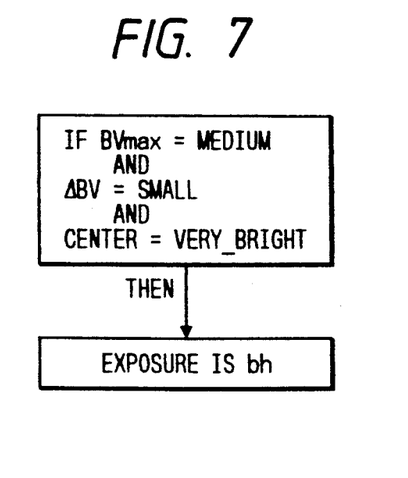
FIG. 7 illustrates an example of a fuzzy rule for the multiphotometric apparatus according to the present invention.

The fuzzy rules corresponding to the photometric methods are arranged to be, for example, as follows: rule about high luminance photometry bh becomes as follows as shown in FIG. 7:

"If BVmax is medium, dBV is small and the center is very bright, an exposure of high luminance weighted photometry is selected".

Figure 8:
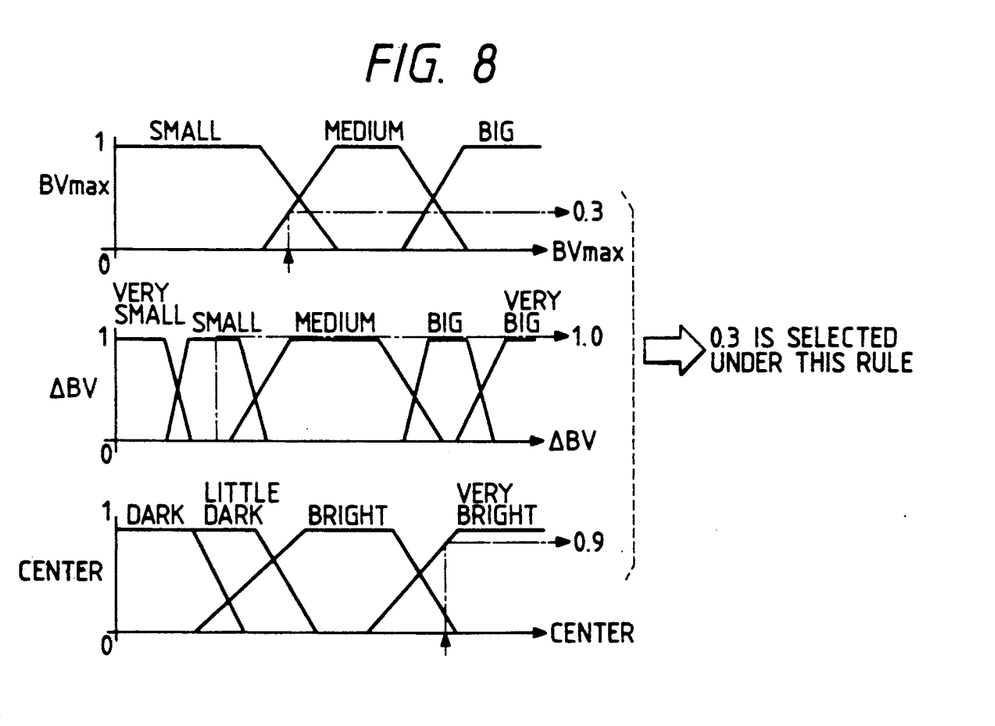
FIG. 8 illustrates a process of obtaining the grade by using a membership function which corresponds to the fuzzy rule.

The membership functions for photometric values BVmax, dBV and CENTER included in the prerequisite portion of the fuzzy rule are shown in FIG. 8. By matching the membership functions with corresponding input values (photometric values), each grade can be obtained. In the case shown in FIG. 8, the grade with respect to BVmax is 0.3, the grade with respect to dBV is 1.0 and the grade with respect to CENTER is 0.9. Since items BVmax, dBV and CENTER in the antecedent portion are connected by AND condition in the fuzzy rule shown in FIG. 7, the minimum output of 0.3 is, as the output of the fuzzy rule, selected from outputs 0.3, 1.0 and 0.9 of the items shown in FIG. 8. That is, the grade of the "high luminance weighted photometry" becomes 0.3.

The aforesaid process is performed in the fuzzy rules corresponding to all of the photometric methods so as to obtain the corresponding grades. Then, a plurality of photometric methods which correspond to the fuzzy rules the grade of each of which is not zero are selected. In accordance with the exposure calculating equations for the selected photometric methods, exposure values for the plurality of the photometric methods are obtained.

When the exposure values corresponding to the plurality of the photometric methods are calculated, weighted means of the exposure values are calculated by using the grades obtained by the corresponding fuzzy rules. Assuming that the high luminance weighted photometry, the mean photometry and the low luminance weighted photometry are selected as the photometric methods corresponding to the fuzzy rules the grade of each of which is not zero and the grade of the high luminance weighted photometry bh is 0.3, the grade of the mean photometry bm is 0.65 and the low luminance weighted photometry bl is 0.9, the optimum exposure value is finally obtained from the following equation:

$$V_o = \frac{(\text{value of } bh) \times 0.3 + \text{value of } bm) \times 0.65 + (\text{value of } bl) \times 0.9}{0.3 + 0.65 + 0.9}$$

wherein, $V_o$ is the optimum value.

Figure 9:
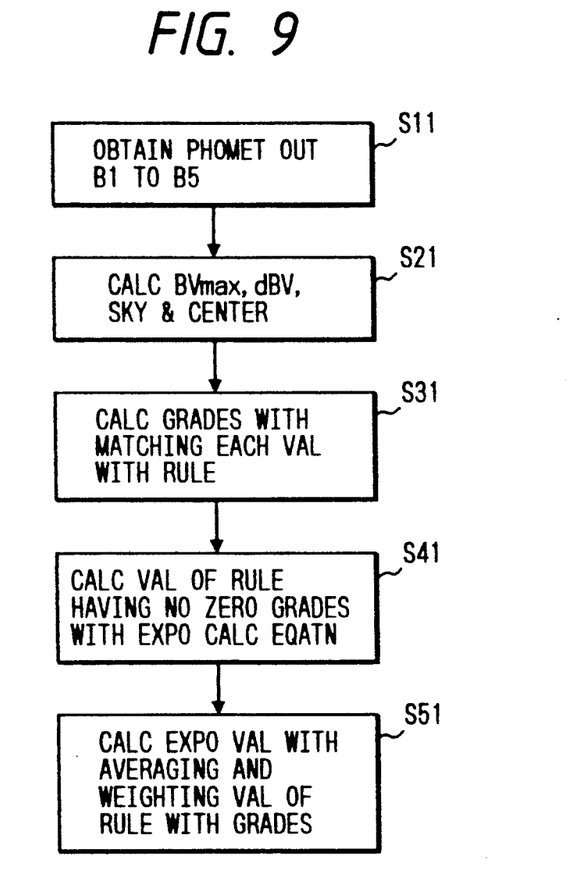
FIG. 9 is a flow chart which illustrates a process of detecting the optimum exposure value for the multiphotometric apparatus according to the present invention.

A process of detecting the optimum exposure value will now be summarized with reference to FIG. 9. First, the photometric outputs B1 to B5 of the light receiving device 7 are detected (S11). By using the photometric outputs B1 to B5, photometric value BVmax, dBV, SKY and CENTER are calculated (S21).

Then, the photometric values and the fuzzy rules corresponding to a plurality of the photometric methods are matched with each other so as to calculate the grades of the fuzzy rules (S31). A photometric method corresponding to the fuzzy rule the grade of which is not zero is then selected and an exposure value corresponding to this photometric method is calculated by the exposure calculating equation for the selected photometric method (S41).

The exposure values obtained by the exposure calculation equations corresponding to the photometric methods thus obtained are mean-weighted with the corresponding grades, so that the optimum exposure value is obtained (S51).

As described above, according to the present invention, the exposure values obtained by corresponding photometric methods adjacent to the boundary can be smoothly connected without output steps. Therefore, a proper exposure value including the portion in the vicinity of the boundary can be obtained. Therefore, a problem that has taken place in, for example, a continuous photographing operation, in that the exposure undesirably varies for each frame, can be prevented. Furthermore, according to the present invention, a photometric value of a combination of outputs of a photometric light receiving device is temporarily generated and the optimum exposure value is detected according to the aforesaid photometric value by the fuzzy inference. Therefore, the degree of freedom in selecting the photometric method can be enlarged and an exposure suitable for the actual object can be determined.

Figure 11:
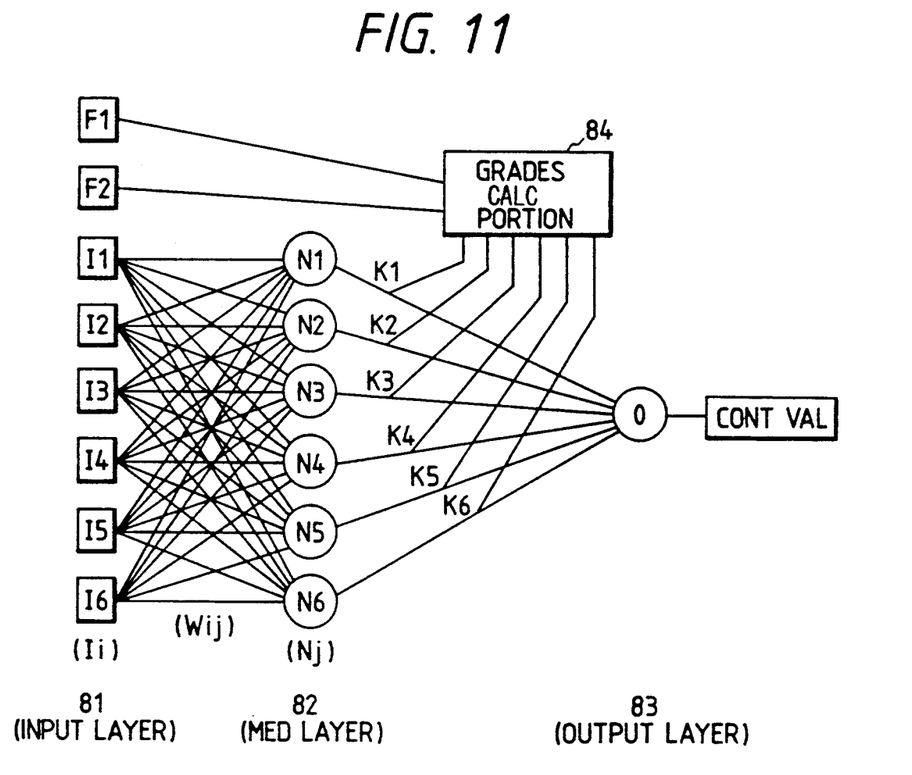
FIG. 11 is schematic view which illustrates a network structure included in a calculating device of the photometric apparatus for the camera according to the embodiment of the present invention.
Figure 14:
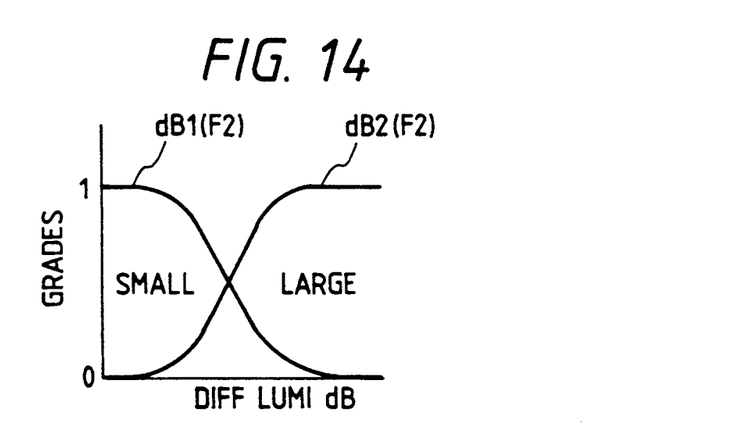
FIG. 14 illustrates the membership function showing the grade with the luminance difference according to the embodiment of the photometric apparatus for the camera according to the present invention.

Another embodiment of the present invention will now be described with reference to the drawings. FIGS. 1, 2, 11 and 12 illustrate an embodiment of the photometric apparatus for a camera according to the present invention. FIG. 1 is a schematic view which illustrates the overall body of a camera, FIG. 2 is a plan view which illustrates a photometric light receiving device, FIG. 11 is a schematic view which illustrates a network structure of a calculating apparatus and FIG. 14 is a flow chart which illustrates the operation of the calculating apparatus.

The photometric apparatus according to this embodiment is embodied in a single-lens reflex camera 1 which comprises, as shown in FIG. 1, a photographing lens 2, a quick return mirror 3, a focusing screen 4, a re-imaging lens 6, a photometric light receiving device 7, a calculating device 8, a shutter drive device 9 and a diaphragm drive device 10.

A light beam transmitted from an object passes through the photographing lens 2 and is reflected by the quick return mirror 3, so that it is imaged on the focusing screen 4 and is observed. An image of the object formed on the focusing screen 4 is again imaged on the photometric light receiving device 7 by the re-imaging lens 6.

The light receiving device 7 is a device for photoelectrically converting the received light beam to obtain photometric outputs and has a photographic frame divided into 5 sections as shown in FIG. 2, the photometric outputs (levels B1 to B5) being connected to the calculating device 8.

The calculating device 8 is formed by a known microcomputer which controls the operation of the overall body of the camera and calculates an exposure value obtained by combining the pattern of the division photometry and the value obtained by extracting the characteristics of the pattern. The output of the calculating device 8 is connected to the shutter drive device 9 and the diaphragm drive device 10, so that the shutter drive device 9 and the diaphragm drive device 10 are controlled according to the calculating exposure value and the film 5 is exposed to light.

The network structure included in the calculating device 8 will now be described with reference to FIG. 11. The calculating device 8 is formed by three hierarchies composed of an input layer 81, an intermediate layer 82 and an output layer 83.

The input layer 81 includes levels I1 to I6 which are inputs of the network. The level I1 indicates the brightness of the central portion of the frame and receives the photometric output level B1 as it is. The level I2 indicates the brightness of the upper portion of the frame and receives the mean value of the photometric output levels B2 and B3. The level I3 indicates the brightness of the lower portion of the frame and receives the mean value of the photometric output levels B4 and B5. The level I4 indicates the brightness of the highlight portion of the frame and receives the maximum value of the photometric output levels B1 to B5. The level I5 indicates the brightness of the shadow portion of the frame and receives the minimum value of the photometric output levels B1 to B5. The level I6 is a constant term and always receives 1.

Although the input value of the input layer 81 is determined to indicate the characteristic of the object, the present invention is not limited to this. If a value indicating another characteristic, for example, the aforesaid input value squared or a value of a higher degree is added, the performance can be further improved.

Extraction elements F1 and F2 are input values to the grade calculating portion 84. The extraction element F1 has an input value which is the same as that of the level I4 which is the maximum value of the photometric output levels B1 to B5, the input value being the luminance of the object according to the present invention. The extraction element F2 has an input of the maximum luminance difference among the photometric output levels B1 to B5.

The intermediate layer 82 has 6 neurons Nj arranged therein and coupled with the inputs of the levels I1 to I6 with learned weight coefficient Wij. The outputs of the neurons Nj are expressed by the following equation:

$$Nj = \Sigma\ Wi Ii\ (i:1...6,\ j:1...6) \qquad (1)$$

Since the neuron Nj according to this embodiment is formed into a simple primary linear form as shown in Equation (1), the outputs corresponding to different inputs are linearly changed and therefore the output is not excessively deviated from the photographer's prediction.

Then, the weighted arithmetic mean of the aforesaid outputs of the neurons Nj is obtained with the grades K1 to K6 determined by the grade calculating portion 84 according to the following equation so as to be transmitted from the output layer 83 as control value O:

$$O = (\Sigma\ Kj\ Nj)/\Sigma\ Kj\ (j:1...6) \qquad (2)$$

The values of the grades K1 to K6 are obtained according to the following 6 rules by a so-called fuzzy process. Rule 1 is a rule that "if the object is dark and the luminance difference is small, the neuron N1 is adopted". Rule 2 is a rule that "if the object is bright and the luminance difference is small, the neuron N2 is adopted". Rule 3 is a rule that "if the object is very bright and the luminance difference is small, the neuron N3 is adopted". Rule 4 is a rule that "if the object is dark and the luminance difference is large, the neuron N4 is adopted". Rule 5 is a rule that "if the object is bright and the luminance difference is large, the neuron N5 is adopted". Rule 6 is a rule that "if the object is very bright and the luminance difference is large, the neuron N6 is adopted".

In the network according to this embodiment, the function of each neuron Nj is differentiated, that is, the function for each Nj is made different, by adding grade Kj for each neuron obtained by the fuzzy process and learning is performed according to the following equation:

$$Wnij = Woij + e\ (T - Nj)\ Ii\ Kj \qquad (3)$$

where e is a parameter for determining the degree of a modifying realized by one operation and is a very small positive value, T is a target value, Woij is a previous weight coefficient and Wnij is a novel weight coefficient.

As a result of learning performed by using Equation (3), each neuron Nj is learned with data which adapts to each of corresponding rules 1 to 6. For example, neuron N1 is learned by using data adapted to region I shown in FIG. 15 and the optimum weight of coupling for the region 1 can be obtained after learning.

Judging from the degree of each weight coefficient Wnij after the learning, the degree of importance of each input in its regions 1 to 6 can be understood and thereby the control with respect to the input can be predicted. For example, weight coefficient W11 is the largest value among the weight coefficient Wil with respect of neuron N1, input I1, that is the photometric value B1 of the central portion is regarded as of major importance.

The weight coefficient Wij is usually learned with data sampled while assuming various objects. Furthermore, a certain set of weight coefficients Wij learned depending upon the subjects of the photography such as portrait and scenery may be prepared so as to be selected to suit the object by the photographer. It can be realized by preparing some sets of the weight coefficients Wij in the camera or by arranging the structure in this way that another weight coefficient Wij can be supplied from outside.

The operation of this embodiment will now be described according to the flow chart shown in FIG. 12 while laying stress on the calculating operation to be performed by the calculating device 8. In step S1, the photometric values B1 to B5 are received from the light receiving device 7 through an AD converter or the like.

In step S2, the levels I1 to I5 of the input values to be supplied to the network are calculated from the photometric values B1 to B5 obtained in step S1 according to the following equations:

$$I1 = B1 \quad (4)$$

$$I2 = (B2 + B3)/2 \quad (5)$$

$$I3 = (B4 + B5)/2 \quad (6)$$

$$I4 = \text{MAX}(B1 \text{ to } B5) \quad (7)$$

$$I5 = \text{MIN}(B1 \text{ to } B5) \quad (8)$$

where MAX is a function showing the maximum value and MIN is a function showing the minimum value.

In step S3, the extraction elements F1 and F2 are calculated from the levels calculated in step S2 according to the following equation:

$$F1 = I4 \quad (9)$$

$$F2 = I4 - I5 \quad (10)$$

In step S4, the grades K1 to K6 are calculated from the extraction elements F1, F2 and the membership function according to the following equations;

$$K1 = \text{MIN}(\text{Bmax }1\,(F1), dB1\,(F2)) \quad (11)$$

$$K2 = \text{MIN}(\text{Bmax }2\,(F1), dB1\,(F2)) \quad (12)$$

$$K3 = \text{MIN}(\text{Bmax }3\,(F1), dB1\,(F2)) \quad (13)$$

$$K4 = \text{MIN}(\text{Bmax }1\,(F1), dB2\,(F2)) \quad (14)$$

$$K5 = \text{MIN}(\text{Bmax }2\,(F1), dB2\,(F2)) \quad (15)$$

$$K6 = \text{MIN}(\text{Bmax }3\,(F1), dB2\,(F2)) \quad (16)$$

Figure 13:
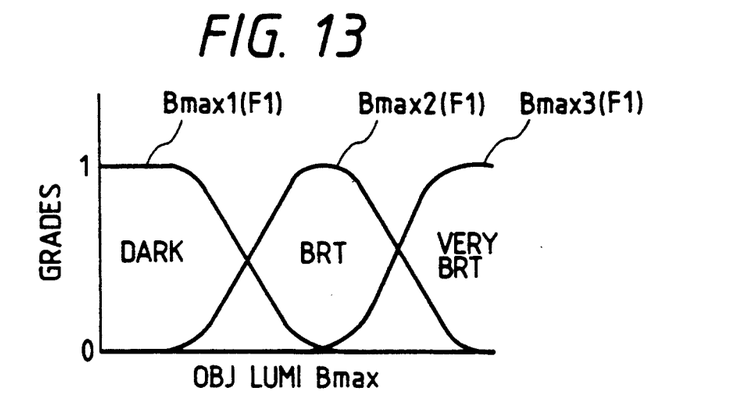
FIG. 13 illustrates the membership function showing the grade with respect to the luminance of the object according to the embodiment of the photometric apparatus for the camera according to the present invention.

The membership function is, as shown in FIG. 13, a function which gives the grades of expressions such as function Bmax1 expressing "dark", the function Bmax2 expressing "bright" and the function Bmax3 expressing "very bright" and is, as shown in FIG. 14, composed of functions indicating the grades of the expressions such as function dB1 expressing "small" and the function dB2 expressing "large". In the aforesaid rules 1 to 6, when an input of F1 is made with respect to the luminance of an object (hereinafter called "Bmax"), the grades of the expressions "dark", "bright" and "very bright" are expressed by the membership functions Bmax1 (F1), Bmax2 (F1) and Bmax3 (F1). When an input of F2 is made with respect to the luminance difference (hereinafter called "dB"), the grades of the expressions "small" and "large" are expressed by the membership functions dB1 (F2) and dB2 (F2).

The aforesaid membership functions are stored so that the adaptable value to each input value is, as a table, stored in a memory of the microcomputer of the calculating device 8 or realized on a program by combining a plurality of equations expressing straight lines.

Figure 15:
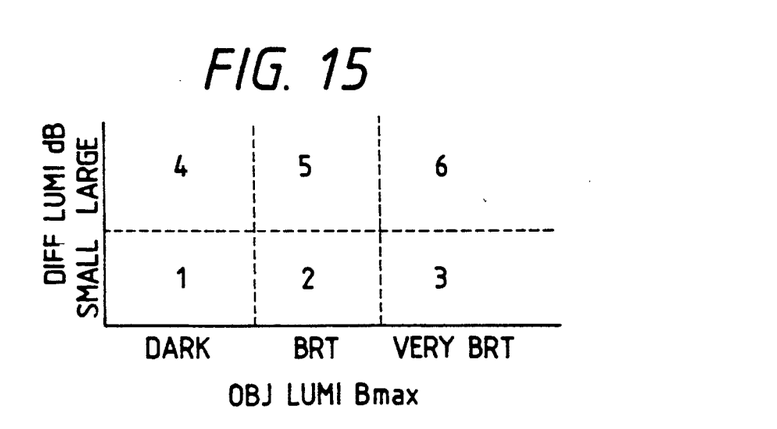
FIG. 15 is a graph which illustrates combinations of the grades of the luminance differences and the object luminances.

In next step S6, the levels I1 to I6 and the learned coupling weight coefficient Wij are used to calculate the neurons N1 to N6 according to the aforesaid Equation (1). Referring to FIG. 15, a process in which the neuron Nj of the intermediate layer 82 is adapted on coordinate Bmax-dB will now be described. Each number (1 to 6) corresponds to the number of the neuron Nj in the intermediate layer 82 and the boundaries of the regions designated by dashed lines are oblique and therefore the portions in the vicinity of the boundaries become values which are an intermediate value of the adjacent neuron outputs N1 to N6 of the intermediate layer 82. Therefore, the change in the output becomes smooth with respect to the change in Bmax (F1) or dB (F2).

In final step S7, the grades K1 to K6 and the neurons N1 to N6 are used to calculate the control value O according to Equation (2). That is, the grades K1 to K6 according to the rules 1 to 6 and calculated in step S4 are made the calculation element having the weight Kj of the coupling of the intermediate layer 82 and the output layer 83 shown in FIG. 11 and the weighted arithmetic means is obtained, so that the control value O can be obtained. As a result, a desired exposure value can be obtained.

Figure 16:
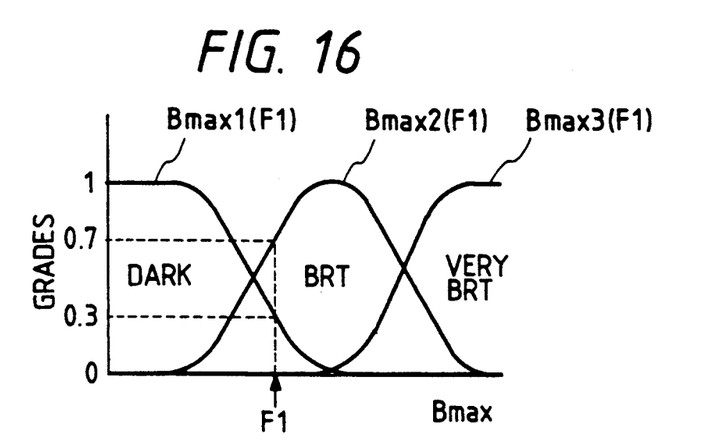
FIG. 16 is a graph which illustrates a state in which the grade of an expression "dark" is determined according to the embodiment of the photometric apparatus for the camera according to the present invention.

A specific method of obtaining the grades of the neurons will now be described with reference to FIGS. 16 and 17. FIG. 16 illustrates a case in which an input of F1 is made as the luminance of the object. In this case, the grade Bmax1 (F1) of the expression "dark" is 0.3, the grade Bmax2 (F1) of the expression "bright" is 0.7 and the grade Bmax3 (F1) of the expression "very bright" is 0.

Figure 17:
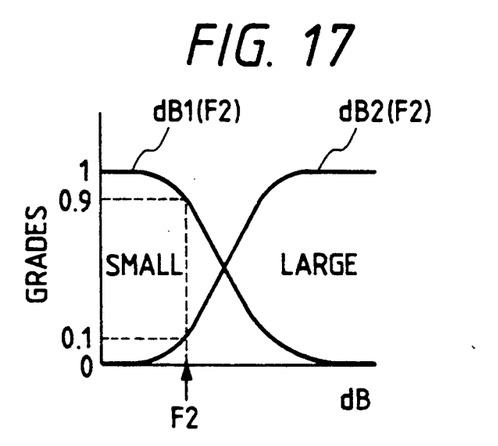
FIG. 17 is a graph which illustrates a state in which the grade of an expression "small" is determined according to the embodiment of the photometric apparatus for the camera according to the present invention.

FIG. 17 illustrates a case in which an input of F2 is made as the luminance difference. In this case, the grade dB1 (F2) of the expression "small" is 0.9 and the grade dB2 (F2) of the expression "large" is 0.1.

Therefore, the grades K1 to K6 of the rules 1 to 6 in the case where inputs F1 and F2 are made become as follows in step S4 shown in FIG. 12:

$$K1 = \text{MIN}(0.3, 0.9) = 0.3$$

$$K2 = \text{MIN}(0.7, 0.9) = 0.7$$

$$K3 = \text{MIN}(0, 0.9) = 0$$

$$K4 = \text{MIN}(0.3, 0.1) = 0.1$$

$$K5 = \text{MIN}(0.7, 0.1) = 0.1$$

$$K6 = \text{MIN}(0, 0.1) = 0$$

Figure 12:
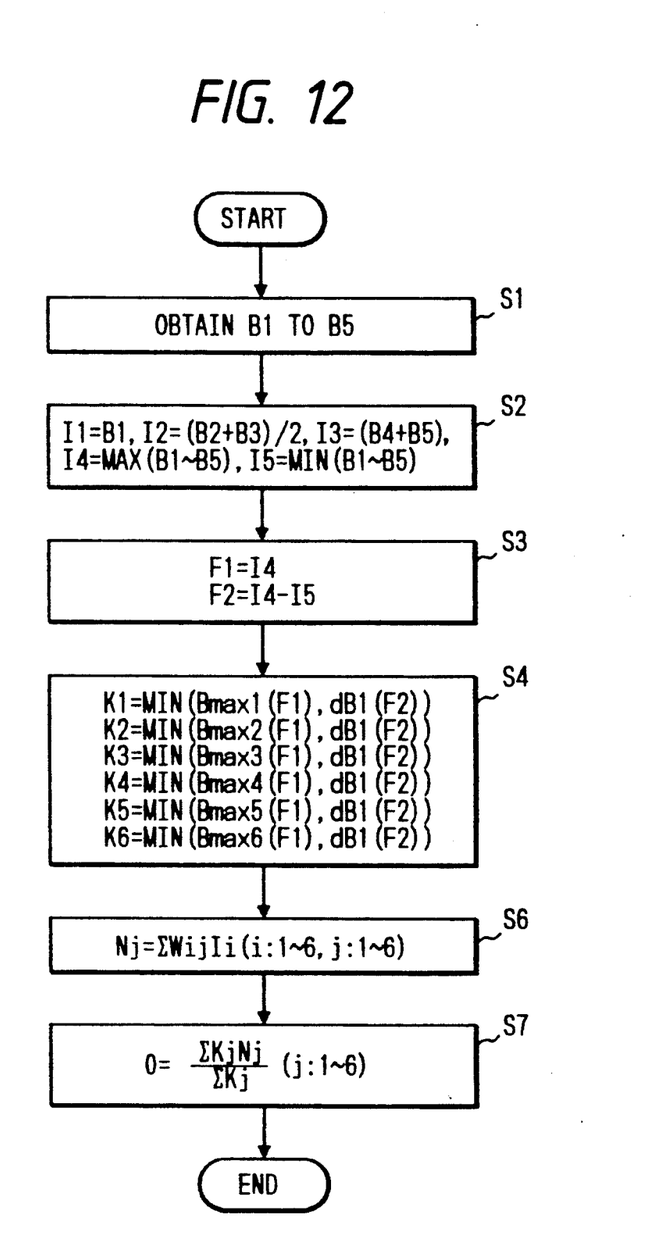
FIG. 12 is a flow chart which illustrates the operation of the calculating device of the photometric apparatus for the camera according to the embodiment of the present invention.

By using K1 to K6, the control value 0 is obtained in step S7 shown in FIG. 12.

The present invention is not limited to the aforesaid embodiments and a variety of modifications and changes are within the scope of the present invention. For example, the grades K1 to K6 of the neuron Nj are, according to this embodiment, determined in such a manner that all of the inputs are subjected to the fuzzy process. However, in a case where there is a limit in shortening the calculation time in the CPU of the calculating device 8 or the program capacity, a system may be employed which uses a process in which the value of grade K is 1 or 0 as an alternative to an intermediate value, that is, only one neuron is selected from the neurons Nj that is adapted to the region shown in FIG. 17. In this case, although the smoothness in the vicinity of the boundaries of the regions is slightly deteriorated, the number of the boundaries can be considerably decreased as compared with the conventional system. Therefore, the accuracy can be improved as compared with the conventional structure, the problem of the boundary can be satisfactorily prevented and the calculating speed can be raised because only selected neurons are calculated.

Although the aforesaid embodiment uses 6 (neurons N) rules, the present invention is not limited to this. The performance can be improved when a larger number of the rules are used. The number of the rules may be determined according to the required accuracy and the capacity of a CPU to be mounted in a camera.

Although a smaller value is employed in a case where the grade is calculated, the product of them may be calculated.

As described above, according to the present invention, the grade is obtained according to the characteristics extracted and weighting is performed. Therefore, smooth exposure values of an object at a boundary of the assumed photographic scene can be obtained.

Since the network structure is formed into a linear shape, the function of each neuron is classified and thereby the output can be predicted, a proper exposure value can be obtained if the photographic scene is slightly changed in terms of the photometry while eliminating a necessity of selecting many object patterns. Furthermore, an optimum exposure value for an object which can be predicted can be obtained while necessitating a slight quantity of learning.

Furthermore, since the calculating device is formed into a small and simple structure, the microcomputer mounted on the conventional camera can perform the required calculations and therefore it can easily be adapted to a product.

Although the invention has been described in its preferred form with a certain degree of particularly, it is understood that the present disclosure of the preferred form may be changed in the details of construction, and the combination and arrangement of parts may be resorted to without departing from the spirit and the scope of the invention as hereinafter claimed.

What is claimed is:

1. An exposure calculating apparatus for a camera having a plurality of processing means for variously processing photometric outputs from regions of an object field divided into plural sections on the basis of photographic conditions so as to determine an optimum exposure value on the basis of the results of processes performed by said processing means, said exposure calculating apparatus for a camera comprising:
    means for setting a plurality of fuzzy rules in the form of membership functions corresponding to processes performed by said plurality of processing means;
    means for calculating a grade of each of said fuzzy rules on the basis of a plurality of values of photometry generated from photometric outputs from said plurality of regions during photography;
    means which selects fuzzy rules having said grades obtained by said calculating so as to calculate, according to said plurality of photometric outputs, exposure values obtained by said processes performed by said processing means which correspond to the selected fuzzy rules; and
    means for determining an optimum exposure value by weighting, with a grade, each of said exposure values obtained by said processes performed by said processing means.

2. An exposure calculating apparatus for a camera according to claim 1, wherein
    said plurality of photometric values include the maximum value (BVmax), the difference (dBV) between said maximum value and the minimum value, a value (SKY) expressing the luminance of the upper portion of said object field and a value (CENTER) expressing the luminance of the central portion of said object field, and
    said means for calculating said grades obtains said grades from matching of said photometric values with said fuzzy rules.

3. An exposure calculating apparatus for a camera according to claim 1, wherein said processes performed by said plurality of processing means include a mean photometry, a central value photometry, a high luminance weighted photometry and a low luminance weighted photometry.

4. A photometric apparatus for a camera having a photometric light receiving device for photometrically measuring a photographic frame by dividing it into a plurality of photometric regions, said photometric apparatus for a camera comprising:
    information output means for outputting a plurality of object information items relating to an object on the basis of an output corresponding to said photometric regions from said photometric light receiving device;
    first calculating means for calculating to generate a plurality of outputs on the basis of said object information and a plurality of predetermined weighting coefficients;
    grade determining means for determining grades of said plurality of outputs from said first calculating means on the basis of said object information items; and
    second calculating means for calculating to generate an exposure control signal on the basis of said plurality of outputs from said first calculating means and said grades determined by said grade determining means.

5. A photometric apparatus for a camera according to claim 4, wherein said grade determining means determines said grades on the basis of a membership function.

6. A photometric apparatus for a camera according to claim 4, wherein said weighting coefficients are changed to approach a target value if said plurality of generated outputs deviate from said target value.

* * * * *